R. L. GORDON.
LENS.
APPLICATION FILED NOV. 24, 1917.
1,269,422.   Patented June 11, 1918.
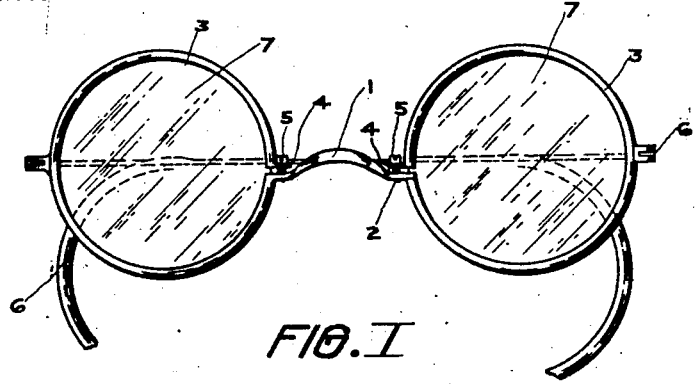
FIG. I
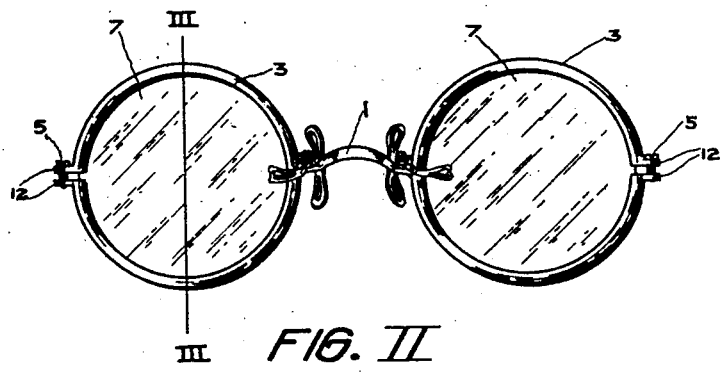
FIG. II
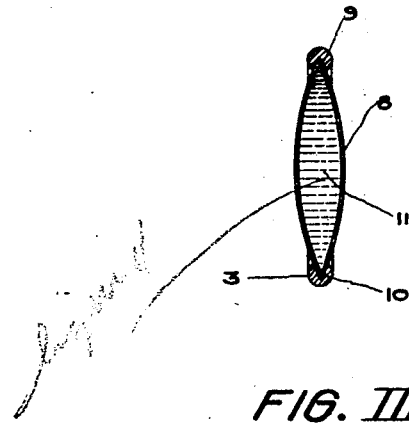
FIG. III
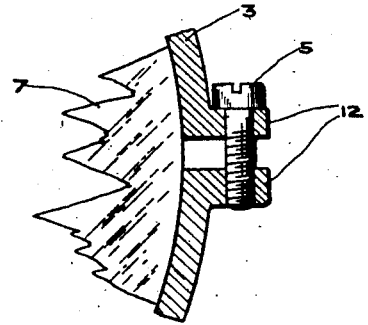
FIG. IV
INVENTOR
ROBERT L. GORDON
BY
H. H. Styll   A. K. Parsons
ATTORNEYS

UNITED STATES PATENT OFFICE.

ROBERT LEITCH GORDON, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

LENS.

1,269,422.  Specification of Letters Patent.  Patented June 11, 1918.

Application filed November 24, 1917. Serial No. 203,726.

*To all whom it may concern:*

Be it known that I, ROBERT L. GORDON, a citizen of the United States, residing at Southbridge, in the county of Worcester and State of Massachusetts, have invented certain new and useful Improvements in Lenses, of which the following is a specification.

This invention relates to new and useful improvements in lenses, and more particularly to a multiple focus lens, the main object of the present invention being the provision of an adjustable focus lens whereby the lens can be quickly and readily adjusted to any focus desired.

Another object of the present invention is the provision of means whereby the lens can be quickly and readily adjusted to various foci without removing the same from the frame, and at the same time is so arranged within the frame that it can be readily removed or placed therein when desired.

With the above and other objects in view the invention consists in the novel features of construction and arrangement of parts hereinafter more fully set forth, pointed out in the claims and shown in the accompanying drawings, in which:

Figure I is a front elevation of a pair of spectacles constructed in accordance with my invention.

Fig. II is a similar view illustrating a pair of eyeglasses constructed in accordance with my invention.

Fig. III is a transverse sectional view taken on the line III—III of Fig. II.

Fig. IV is a detail transverse section illustrating the manner of connecting the ends of the lens frames.

In Fig. I, I have illustrated my invention as applied to a pair of spectacles, in which the numeral 1 indicates the nose bridge having extending laterally from each end thereof the bridge seats 2. In this form of the invention the lens frames 3 are connected integrally at one end with the bridge seats 2, while the other ends of the frames are extended laterally to provide the ears 4, which are disposed above the bridge seats 2 and adjustably connected thereto by means of the screw members 5. The lens frames 3 are provided at their outer sides thereof with the usual temples 6 whereby the spectacles may be applied to the face and securely held in their relative position.

It will be apparent that in placing the lenses 7 in position within the frames 3, the screw members 5 are disengaged from the bridge seats 2 so that the lens frames can be opened to permit of the insertion of the lenses 7 therein and after the lenses have been positioned within the frames the ears 4 are disposed above the bridge seats 2 and the screws 5 engaged therein and threaded into the bridge seats to retain the lenses 7 in position. In the construction of the lenses proper I provide two arcuately curved side portions 8 which are merged together at their circumferential edges, as shown at 9, the body portions being arranged in opposed relation so as to form a pocket or cell therebetween, and in this body or cell a suitable amount of transparent liquid is placed, which forms a cushion for the side portions 8 should an object strike the outer walls thereof, and at the same time will assist in the adjustment of the side portions 8 toward or away from each other.

It will be noted in Fig. III that the circumferential edges of the lenses are disposed within suitable grooves 10 formed in the lens frames 3, said grooves being of substantially V-shaped formation to correspond with the pyramidal form at the edge of the lens. It will be noted that after the lenses 7 have been placed within the frames 3 the screw members 5 are engaged with the bridge seats 2 to normally retain them in their relative positions, but should it be desired to change the focus of the lenses the screw members 5 are further engaged with the bridge seat 2 so as to bring the ends of the frames 3 nearer together and at the same time bring pressure to bear upon the edge of the lenses, which will, together with the assistance of the liquid, tend to spring the said portions 8 away from each other sufficiently to change the foci of the lenses. The liquid disposed between the side portions 8, which is illustrated at 11, may be of any transparent solution, which will assist in the adjustment of the side portions and at the same time form a suitable cushion between these members.

In Fig. II, I have illustrated a slightly modified form of the invention, wherein the lenses are mounted within eyeglass rims, and in this form of the invention the adjusting screw 5 is disposed upon the outer sides of the lens frames. It will be apparent that the immediate ends of the lens frames are provided with the ears 12 arranged in opposed relation, one of said ears being adapted to receive the screw 5, and the screw having threaded engagement with the other of the ears to adjust said ears toward or away from each other to increase or decrease the diameter of the frames to provide for adjustment of the lens. It will be apparent from the foregoing that by adjusting the screw 5 the side portions of the lenses may be adjusted to obtain various foci. The side portions 8 of the lenses may be of different refractive indices, as I do not wish to be limited to any special indice and at the same time it will be apparent that plain lenses can be used equally as well as any other.

I claim:

1. A lens including spaced opposed walls merged together at their circumferential edges, and means whereby these walls may be adjusted toward or away from each other.

2. A lens including spaced opposed walls merged together at their circumferential edges, cushioning means disposed between said walls, and means whereby the walls may be adjusted toward or away from each other.

3. A lens including spaced walls of arcuate formation arranged in opposed relation and having their circumferential edges merged together, a liquid body disposed between said walls, and means whereby the walls may be adjusted toward or away from each other.

In testimony whereof I have affixed my signature, in presence of two witnesses.

ROBERT LEITCH GORDON.

Witnesses:
H. E. COLEMAN,
A. S. CANN.

Copies of this patent may be obtained for five cents each, by addressing the " Commissioner of Patents, Washington, D. C."